No. 693,178. Patented Feb. 11, 1902.
J. P. SNEDDON.
APPARATUS FOR FORMING HOLLOW OR TUBULAR ARTICLES OF IRREGULAR SHAPE.
(Application filed Apr. 12, 1901.)
(No Model.) 2 Sheets—Sheet 1.
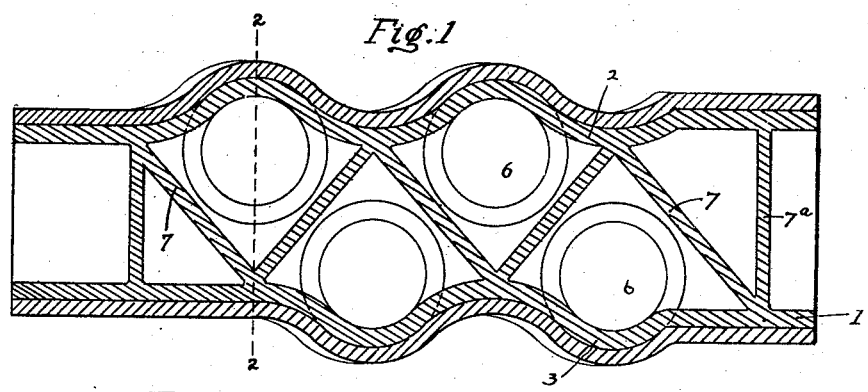
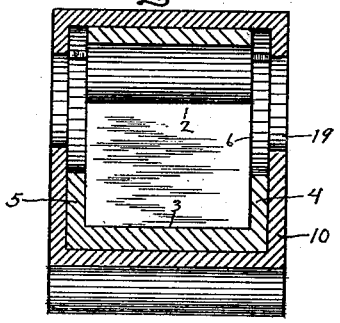
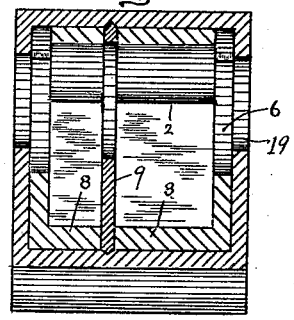
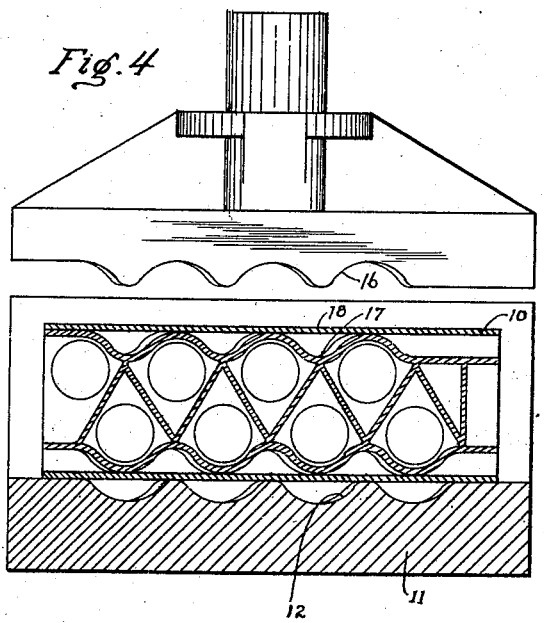
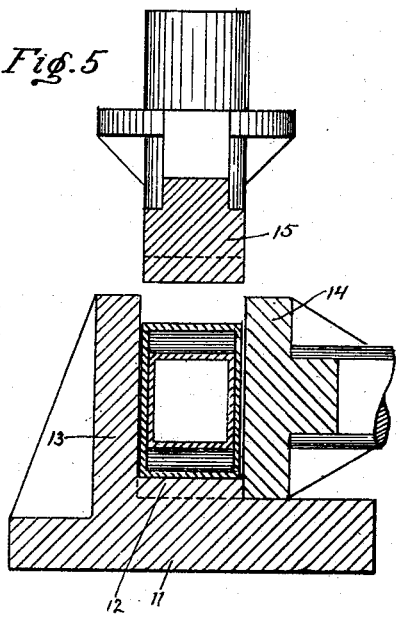
Witnesses
Fred D. Swift
Walter Tamasine
Inventor
James P. Sneddon
By Kay & Totten
Attorneys.

No. 693,178. Patented Feb. 11, 1902.
J. P. SNEDDON.
APPARATUS FOR FORMING HOLLOW OR TUBULAR ARTICLES OF IRREGULAR SHAPE.
(Application filed Apr. 12, 1901.)
(No Model.) 2 Sheets—Sheet 2.
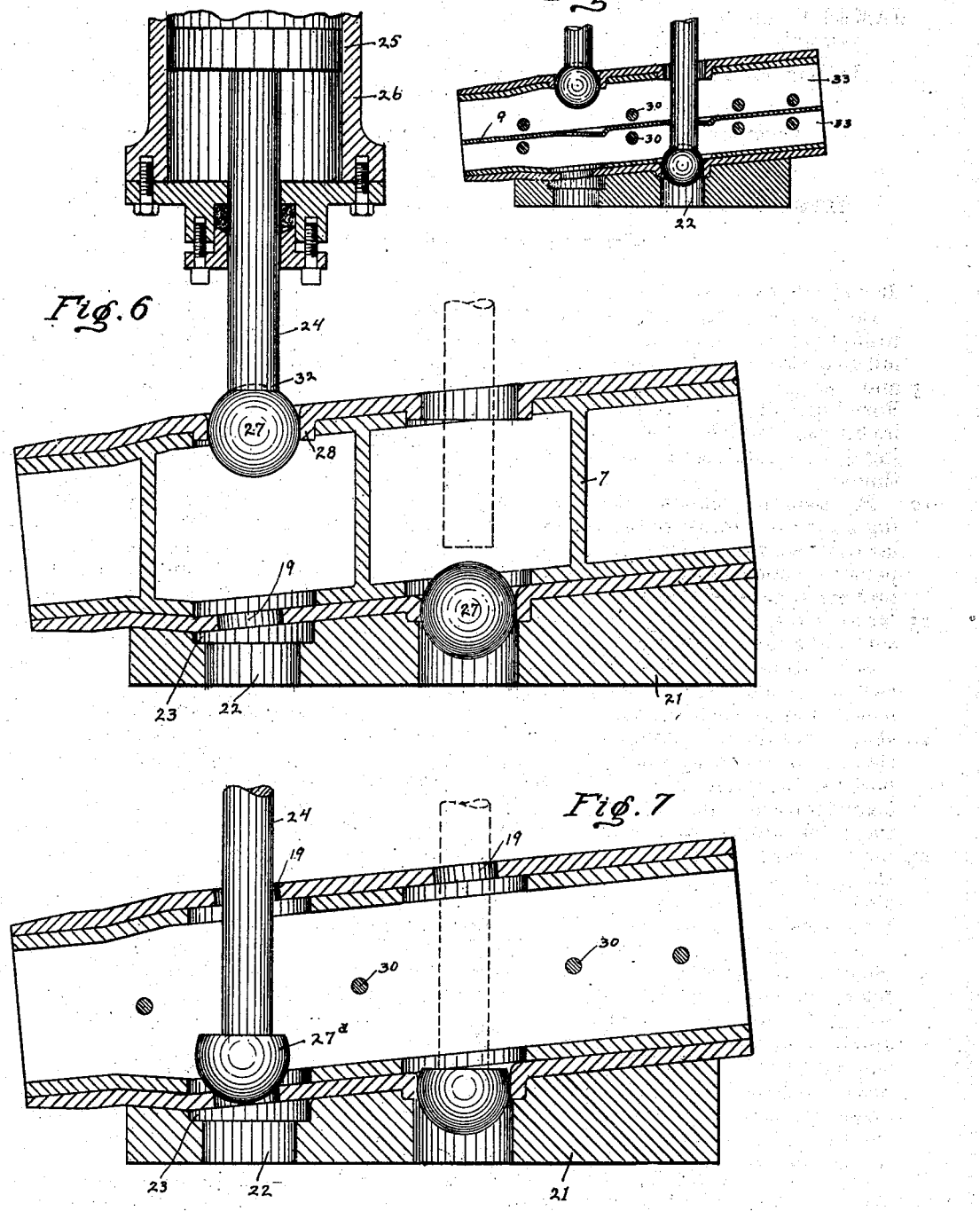

UNITED STATES PATENT OFFICE.

JAMES P. SNEDDON, OF BARBERTON, OHIO, ASSIGNOR, BY MESNE ASSIGNMENTS, TO THE STIRLING COMPANY, OF JERSEY CITY, NEW JERSEY, A CORPORATION OF NEW JERSEY.

APPARATUS FOR FORMING HOLLOW OR TUBULAR ARTICLES OF IRREGULAR SHAPE.

SPECIFICATION forming part of Letters Patent No. 693,178, dated February 11, 1902.

Application filed April 12, 1901. Serial No. 55,546. (No model.)

*To all whom it may concern:*

Be it known that I, JAMES P. SNEDDON, a resident of Barberton, in the county of Summit and State of Ohio, have invented a new and useful Improvement in Apparatus for Forming Hollow or Tubular Articles of Irregular Shape; and I do hereby declare the following to be a full, clear, and exact description thereof.

My invention relates to apparatus for forming hollow or tubular metal articles of irregular cross-section—such, for instance, as serpentine boiler-headers—and its object is to provide apparatus for both shaping the tubular article and flanging holes formed in the side walls thereof.

Serpentine boiler-headers and similar articles are made from comparatively heavy metal, and as such articles are irregular in shape considerable difficulty has been experienced in providing a suitable internal support for the same which will withstand the heavy pressure necessary to properly shape the thick walls of the header, and which is nevertheless capable of being removed from the header or other article after the same is shaped. Furthermore, in certain classes of boiler-headers, such as in the Niclausse boiler, it is necessary to provide the header with a longitudinal diaphragm in order to separate the two currents of circulation in said header, which diaphragm preferably should be secured in the header during the shaping operation thereof. After the shaping of the header either with or without the diaphragm it is necessary to form flanges around the holes in the sides of the header to provide proper seats for the water-tubes.

The object of my invention is to provide a mandrel which is adapted to have the header or other article shaped thereon, and so constructed as to permit the flanging of the holes in the sides of the header or other article, and which is capable of being then removed therefrom.

To this end it comprises a rigid destructible support formed either in a single piece or of longitudinal sections, which is of the proper shape to form the desired article, and which is inserted in the tube and adapted to have the walls of the latter pressed down upon the same to shape the header or other article, and which is provided with recesses in its side faces or openings extending entirely through the same, which will permit the flanging of the holes in the sides of the header or other article. It also comprises such a mandrel in combination with a suitable bed-die and plunger or punch.

It also comprises the use of such a mandrel in combination with the dies for shaping the tubular article on the same and the bed-die and plunger for flanging the holes in the sides of the header. It also comprises such a mandrel in combination with a suitable bed-die, plunger, and a separate ball or other body or implement which serves as the flanging element.

In the accompanying drawings, Figure 1 is a longitudinal sectional view of one form of mandrel adapted for this purpose with the header formed thereupon. Fig. 2 is a cross-section of the same. Fig. 3 is a cross-section of the said mandrel formed in longitudinal sections to permit the application of a diaphragm to the header. Fig. 4 is a vertical longitudinal section of the forming-dies, showing the mandrel and tube in place. Fig. 5 is a vertical cross-section of the same. Fig. 6 is a sectional elevation showing the said mandrel and the bed-die, plunger, and ball used for flanging the holes in the sides of the header. Fig. 7 is a detail sectional view of a modified form of mandrel and ball, and Fig. 8 is a detail sectional view of the last-named form of mandrel formed in longitudinal sections to permit the application of a diaphragm to the header.

The mandrel shown in Fig. 1 is composed of a hollow cast-iron body 1, having the corrugated or sinuous top and bottom faces 2 and 3 and the substantially flat and parallel side faces 4 and 5, which side faces are provided with the holes 6. In order to strengthen this hollow body to withstand the action of the shaping and flanging dies, it is provided with transverse webs or supports 7, which are arranged zigzag, as shown in Fig. 1, in order that the same may not lie in front of the holes 6, and as the latter are arranged in staggered relation and close together it is not desirable or possible to arrange the webs or supports 7 straight across the mandrel. At the ends of the mandrel, however, the said webs or supports may be arranged straight across, as shown at 7ª.

For ordinary serpentine headers, such as the Babcock and Wilcox header, the mandrel will be formed of a single piece, as shown in cross-section, Fig. 2. In case, however, it is desired to form headers for Niclausse or other boilers which must have a longitudinal diaphragm the said mandrel will be formed in two longitudinal sections, as shown at 8 8, Fig. 3, the meeting faces of said sections corresponding to the shape of the diaphragm 9, as shown in Fig. 8, said sections being adapted to have the diaphragm placed between the same and held in position thereby. In the use of either the form of mandrel shown in Fig. 2 or that shown in Fig. 3 the integral mandrel or the sectional mandrel, with an interposed diaphragm, is inserted in a previously-squared tube 10, and said mandrel and tube are then placed in the shaping-dies, said dies comprising the stationary bed-die 11, formed with the sinuous or corrugated face 12, and a stationary flat-faced side die 13, which may be formed integrally with the bed-die 11, as shown, or secured thereto in any suitable manner. Opposite to the flat-faced side die 13 is a flat-faced movable side die 14, which preferably is moved by means of a hydraulic cylinder, (not shown,) but may be moved by any other mechanism, such as a cam or wedge. The top die 15 is movable—as, for instance, by means of a hydraulic cylinder (not shown) or a cam or similar device—and is provided with a corrugated or sinuous working face 16. In the operation of these dies the side die 14 is first brought against the sides of the tube, confining the same between said die and the die 13, after which the top die 15 is brought down, thereby pressing the metal of the tube 10 down upon and to conform to the shape of the mandrel. The metal composing the side walls of the tube 10 is upset a distance corresponding to the space 17 18, and in order to get a proper upsetting of this metal and a uniform shaping and thickness of the side walls of the header it is desirable that the side die 14 be first brought against the tube lightly, and after the upper die has been brought down then said side die is brought firmly into place, or it may be desirable to give the dies 14 and 15 alternate short inward and outward movements in order to secure the best upsetting of the side walls of the tube. In case the sectional mandrel (shown in Fig. 3) is used the diaphragm will be cut to shape and will be about one thirty-second of an inch wider than the mandrel, so that when the dies 11 and 15 press the walls of the tube 10 down upon the mandrel the edges of said diaphragm will embed themselves slightly in the walls of the tube, whereby the diaphragm is held firmly in place, or said diaphragm may be provided with edge projections which embed themselves in the walls of the diaphragm, which projections may be of sufficient length to penetrate the walls of the tube and be upset on the outside thereof, as described in my application Serial No. 55,542, of even date herewith.

The tube 10 will be formed with the openings 19 in its side walls prior to being placed over the mandrel, and after the said tube is shaped on said mandrel it is ready for the flanging operation. For this purpose I provide a suitable bed die or support 21, which is provided with openings or recesses 22 and the cut-away portions 23 around said openings, which form, in effect, die-cavities. The mandrel, with the shaped header, is placed upon said bed die or support, and the plunger 24, which may be actuated by any suitable mechanism—such, for instance, as the piston 25, working in the power-cylinder 26—is then used to force a ball 27 or other suitable body or implement through the openings 19, as shown in Fig. 6, thereby turning in the metal around said openings to form the flanges 28, as shown, and in case it is desired to turn the flanges on the opposite side outward the said ball is then forced through the opening in the opposite wall of the header down through the opening 22 in the bed die or support, and after all of the holes have been flanged in this manner the mandrel is broken out by means of a bar or other suitable implement. In the practical working of the flanging operation the bed die or support 21 will preferably be made of sufficient size with sufficient openings or recesses 22 to accommodate all the holes in the header, and a gang of plungers or punches 24 will be used to force a corresponding number of balls or other bodies through the holes in the header, thereby flanging all the holes on one side of the header at a single operation. In case it is desired to turn the flanges on both sides inward then after the flanging implement has been forced through the openings in the upper wall of said header the header is turned over and the same process repeated on the opposite side; but when it is desired to turn the flanges on one side inward and on the opposite side outward then the operation illustrated in Fig. 6 is followed.

In Fig. 7 I have shown a modified form of mandrel in which the hollow metal body of the mandrel is strengthened by means of the transverse struts 30, which extend across between the corrugated or sinuous faces 2 and 3 of the mandrel, which struts strengthen and support the mandrel during the shaping of the header thereupon in the dies shown in Figs. 4 and 5. This form of mandrel permits the flanging of the holes on both sides of the header outward, as shown in said Fig. 7, by inserting a flattened ball or similar body 27ª in the tubular header and then bringing the plunger 24 through the opening 19 on the opposite side of the header and forcing said ball down through the opening 22 in the bed-die 21, there being but a single row of struts 30, to allow sufficient space for insertion of this ball 27ª. The ball 27ª is shown flattened, as in the usual form of header. The dimensions thereof are not sufficient to permit the insertion of a spherical ball between the walls and struts of the mandrel; but in case the dimensions are sufficient a spherical ball will preferably be used, as it requires no positioning and can be centered by means of the concave recess 32 in the end of the plunger, as shown in Fig. 6. The ball is not absolutely necessary in the operation illustrated in Fig. 6, as the end of the punch itself may be so shaped as to perform the flanging; but in the operation shown in Fig. 7 a ball, or at least some body separate from the punch, must be employed in order that it may be inserted in the tube and forced through the holes in the wall on the lower side thereof, after which the header is turned over and the process repeated on the holes in the opposite wall thereof, whereby a header is formed having the flanges on both sides turned outward.

In Fig. 8 I have shown a modification of the mandrel shown in Fig. 7, wherein said mandrel is formed in two sections 33 33, adapted to receive the diaphragm 9 between them, and in said modification two rows of struts 30 are employed, as will be obvious. This form of mandrel will be used in the flanging operation precisely as the form of mandrel shown in Fig. 6 and will permit the flanges being turned inward on both sides or inward on one side and outward on the other, as shown in Fig. 6, but ordinarily will not permit them being turned outward on both sides, as shown in Fig. 7, for the reason that the space between the walls of the mandrel and the row of struts 30 will not permit the insertion of a flattened ball or other body. In case of headers of large sectional area, however, this space may be sufficient to permit the insertion of a hemispherical ball or similar body, and in that case it will be possible to turn the flanges on both sides outward in the manner illustrated in Fig. 7.

In most water-tube boilers the water-tubes are placed on an incline. Consequently the holes on the opposite sides of the header will be on an incline, as shown in Figs. 6 to 8, and consequently the upper face of the bed-die 21 will be inclined, as shown, and the transverse corrugations on the upper and lower faces of the mandrel, as shown in Fig. 1, will be slightly inclined instead of running straight across the same, and the corrugations on the dies 11 and 15 will be similarly inclined. In case, however, that the water-tubes are to be placed horizontally the holes in the sides of the header would be directly opposite each other, in which case the face of the bed-die 21 would be horizontal and the corrugations on the mandrel and on the shaping-dies would run straight across the same, as will be readily understood.

While I have shown the mandrel as a hollow cast body, I desire it understood that my invention is not limited thereto, in that it comprises any rigid support for the interior of the tube, which support is capable of being removed from the tube after the same is formed thereupon, and it may comprise either a rigid destructible body, such as shown, or any other rigid destructible body, or a sectional body which is capable of being inserted in the tube and held in rigid position during the shaping and flanging operations, and then removed therefrom. Furthermore, while I have shown the mandrel provided with openings extending entirely through the same, so that the punch can pass through, as shown in Figs. 6 and 7, this is not necessary in case the flanges on both sides of the header are to be turned inward, in which event it will be merely necessary to provide the mandrel with recesses on its opposite faces, as will be readily understood.

The terms "apertures" and "apertured" in the claims are intended to cover either such recesses in the faces of the mandrel or bed-die or openings extending entirely therethrough.

What I claim, and desire to secure by Letters Patent, is—

1. A mandrel for use in forming wrought-metal tubular articles, the same comprising a rigid support of the desired form adapted to be inserted in the tube and have the latter pressed thereupon, and capable of being then removed from said tube, said mandrel having apertures formed in the side faces thereof.

2. A mandrel for use in forming wrought-metal tubular articles, the same comprising a rigid support of the desired form adapted to be inserted in the tube and have the latter pressed thereupon, and to be then removed therefrom, said mandrel having apertured side faces and being provided with transverse corrugations on the upper and lower faces thereof.

3. A mandrel for use in forming wrought-metal tubular articles, the same comprising a rigid destructible support of the desired form adapted to be inserted in the tube and have the latter pressed thereupon, said mandrel having apertured side faces.

4. A mandrel for use in forming wrought-metal tubular articles, the same comprising a rigid support of the desired form adapted to be inserted in the tube and have the latter pressed thereupon, and to be then removed from the same, said mandrel being provided with openings extending through the same.

5. A mandrel for forming wrought-metal tubular articles, the same comprising a hollow destructible body provided with rigid internal supports to strengthen the same, and adapted to be inserted in the tube and have the latter pressed thereupon, said mandrel having apertured side faces.

6. A mandrel for use in forming wrought-metal tubular articles, the same comprising a hollow cast-metal body provided with interior transverse supports, and having alining openings in its opposite side walls.

7. A mandrel for use in forming wrought-metal tubular articles, the same comprising a hollow cast-metal body having upper and lower corrugated faces, and internal transverse supports extending between said faces, the side walls of said mandrel being provided with alining openings.

8. A mandrel for use in forming wrought-metal tubular articles having a diaphragm, the same comprising a rigid support composed of longitudinal sections adapted to receive a diaphragm between them, and hold the same in place in the tube and have the latter pressed thereupon and to be then removed therefrom, said mandrel having apertured side faces.

9. A mandrel for use in forming wrought-metal tubular articles having a diaphragm, the same comprising a rigid destructible support composed of longitudinal sections adapted to receive the diaphragm between them, and to be inserted in the tube and have the latter pressed thereupon, said mandrel having apertured side faces.

10. A mandrel for use in forming wrought-metal tubular articles having a diaphragm, the same comprising a rigid support composed of longitudinal sections adapted to receive the diaphragm between them, and to be inserted in the tube and have the latter pressed thereupon, and to be then removed from the tube, said mandrel being provided with transverse openings passing through the same.

11. A mandrel for use in forming wrought-metal tubular articles having a diaphragm, the same comprising a hollow body provided with internal transverse supports and composed of longitudinal sections adapted to receive the diaphragm between them and to be placed in the tube and have the latter pressed thereupon and capable of being then removed therefrom, said mandrel having alining openings in its opposite side walls.

12. A mandrel for use in forming wrought-metal tubular articles having a diaphragm, the same comprising a hollow cast-metal body with transverse internal supports, and composed of longitudinal sections adapted to receive the diaphragm between them, said mandrel being formed with alining openings in its opposite side walls.

13. A mandrel for use in forming wrought-metal tubular articles, the same comprising a hollow cast-metal body provided with interior transverse struts between its upper and lower faces, and having alining openings in its opposite side walls.

14. In apparatus for forming wrought-metal tubular articles, the combination with a mandrel comprising a rigid support of the desired form adapted to be inserted in the tube and have the latter pressed thereupon, said mandrel having apertured side faces, of a bed die or support, and a plunger or similar flanging-tool.

15. In apparatus for forming wrought-metal tubular articles, the combination with a mandrel comprising a rigid support of the desired form adapted to be inserted in the tube and have the latter pressed thereupon, said mandrel having apertured side faces, of suitable forming-dies adapted to be inserted in the tube and have the latter pressed thereupon, said mandrel having recessed side faces, of suitable forming-dies adapted to press the tube upon the mandrel, a supporting die and plunger adapted to flange the metal around the holes in the side walls of the tube.

16. In apparatus for forming wrought-metal tubular articles, the combination with a mandrel comprising a rigid support of the desired form adapted to be inserted in the tube and have the latter pressed thereupon, said mandrel being provided with transverse openings, of a bed die or support with recesses therein, and a plunger or similar flanging-tool.

17. In apparatus for forming wrought-metal tubular articles, the combination with a mandrel comprising a rigid destructible support of the desired form adapted to be inserted in the tube and have the latter pressed thereupon, said mandrel having apertured side faces, of a supporting bed or die, and a plunger or similar flanging-tool.

18. In apparatus for forming wrought-metal tubular articles, the combination with a mandrel comprising a rigid destructible support of the desired form adapted to be inserted in the tube and have the latter pressed thereupon, said mandrel being provided with transverse openings, of a supporting bed or die provided with openings, and a plunger or similar flanging-tool.

19. In apparatus for use in forming wrought-metal tubular articles, the combination with a mandrel comprising a hollow body provided with rigid internal supports to strengthen the same and with alining openings in its opposite sides, of a bed die or support provided with apertures, a plunger, and a separate body adapted to be forced by said plunger through the openings in the walls of the tube in order to flange the same.

20. In apparatus for forming wrought-metal tubular articles, the combination with a mandrel comprising a destructible hollow rigid body of the desired form adapted to be inserted in the tube and have the latter pressed thereupon, said mandrel having alining openings formed in its opposite walls, of a bed die or support provided with recesses, a plunger, and a flanging device separate from the plunger and adapted to be forced by the same through the openings in the walls of the tube to flange the same.

21. In apparatus for forming wrought-metal tubular articles, the combination with a mandrel comprising a hollow cast-iron body having transverse struts extending between its upper and lower faces and provided with alining openings in its side walls, of a bed die or support provided with apertures, a plunger, and a flattened ball adapted to be forced by the plunger through the holes of the side walls of the tube to flange the same.

In testimony whereof I, the said JAMES P. SNEDDON, have hereunto set my hand.

JAS. P. SNEDDON.

Witnesses:
O. D. EVERHARD,
E. E. BAKER.